(12) United States Patent
Sung

(10) Patent No.: US 9,439,464 B2
(45) Date of Patent: Sep. 13, 2016

(54) FABRIC BONDING STRUCTURE AND PROCESSED FABRIC GOODS HAVING THE SAME

(71) Applicant: YOUNGWON CORPORATION, Seoul (KR)

(72) Inventor: Ki Hak Sung, Seoul (KR)

(73) Assignee: YOUNGWON CORPORATION, Seoul (KR)

( * ) Notice: Subject to any disclaimer, the term of this patent is extended or adjusted under 35 U.S.C. 154(b) by 48 days.

(21) Appl. No.: 14/668,305

(22) Filed: Mar. 25, 2015

(65) Prior Publication Data

US 2016/0213077 A1 Jul. 28, 2016

(30) Foreign Application Priority Data

Jan. 28, 2015 (KR) ........................ 10-2015-0013748

(51) Int. Cl.
| | |
|---|---|
| *B32B 7/12* | (2006.01) |
| *A41D 27/12* | (2006.01) |
| *B32B 7/04* | (2006.01) |
| *B32B 3/04* | (2006.01) |
| *B32B 5/26* | (2006.01) |
| *A41D 3/00* | (2006.01) |

(52) U.S. Cl.
CPC ................ *A41D 27/12* (2013.01); *A41D 3/00* (2013.01); *B32B 3/04* (2013.01); *B32B 5/26* (2013.01); *B32B 7/045* (2013.01); *B32B 2437/00* (2013.01)

(58) Field of Classification Search
CPC . Y10T 428/24802; B32B 7/12; B32B 7/045; A41D 27/245; A41D 27/24
USPC .................................................. 428/121, 188
See application file for complete search history.

(56) References Cited

U.S. PATENT DOCUMENTS 5,249,323 A * 10/1993 Kikuchi ............... A47G 9/0207
112/440

* cited by examiner

*Primary Examiner* — Alexander Thomas
(74) *Attorney, Agent, or Firm* — Stein IP, LLC

(57) ABSTRACT

Disclosed are a fabric bonding structure and processed fabric goods having the same. The fabric bonding structure includes: a first fabric; a second fabric provided so as to be in contact with the first fabric; and a bonding member having a first surface and a second surface at the other side of a side of the first surface, and being folded so that two points of the first surface meet, and the second surface being bonded to each of the first fabric and the second fabric, and the fabric bonding structure is applicable to processed fabric goods, such as clothes and bedclothes. According to the fabric bonding structure and the processed fabric goods having the same, it is possible to isolate fillings filled inside a fabric from the outside even without forming a sewing line, and bonding force at a bonding portion is excellent compared to a method of forming a sewing line or a bonding method using an adhesive in the related art.

20 Claims, 7 Drawing Sheets

FABRIC BONDING STRUCTURE AND PROCESSED FABRIC GOODS HAVING THE SAME

CROSS-REFERENCE TO RELATED APPLICATIONS

This application claims priority to and the benefit of Korean Patent Application No. 10-2015-0013748 filed in the Korean Intellectual Property Office on Jan. 28, 2015, the entire contents of which are incorporated herein by reference.

BACKGROUND OF THE INVENTION

1. Technical Field

The present invention relates to a fabric bonding structure and processed fabric goods having the same, and more particularly, to a fabric bonding structure, in which fabrics may be bonded without sewing, and processed fabric goods, such as clothes and bedclothes, having the fabric bonding structure.

2. Background Art

Various kinds of fabric, such as textile and leather, have been used as fundamental materials for manufacturing clothes, bedclothes, and the like. In general, clothes, bedclothes, or the like are produced by first cutting a fabric having a predetermined size in accordance with a shape of clothes desired to be produced, and connecting the cut fabrics with each other by sewing the cut fabrics.

In this process, an inner side of the clothes is filled with fillings and the like for keeping warmth. For example, cotton, synthetic resin cotton, animal hair, such as duck down and goose down, and the like may be filled. However, when the fabrics are connected by the manner of sewing the fabrics which are cut in predetermined shapes, a sewing line including needle holes is inevitably created in a connection portion of the fabrics. Goose down and the like among the fillings may be discharged to the outside through the sewing line.

When a bonding structure using an adhesive and the like is used in order to prevent the fillings from being discharged to the outside, there is a problem in that bonding force deteriorates due to long-term use or a bonding structure is deformed due to sudden application of external force. A bonding structure for isolating fillings from inner/outer sides of clothes is an issue directly connected to a product quality and durability of clothes, so that a lot of research thereon has been conducted.

However, a technique satisfying all of improvement of durability of the bonding structure and a function of preventing fillings from being discharged to the outside is not sufficient yet.

SUMMARY OF THE INVENTION

The present invention has been made in an effort to provide a fabric bonding structure, in which fabrics may be bonded without sewing and which has excellent bonding force at a bonded portion, and processed fabric goods having the same.

The present invention has also been made in an effort to provide a fabric bonding structure, which prevents fillings and the like from being arbitrarily discharged to the outside, and processed fabric goods having the same.

The present invention has also been made in an effort to provide a fabric bonding structure, which prevents fillings and the like from being discharged to the outside even when a sewing line or a ventilation hole is formed for finishing clothes, a design element, and a function of clothes, and processed fabric goods having the same.

An exemplary embodiment of the present invention provides a fabric bonding structure, including: a first fabric; a second fabric provided so as to be in contact with the first fabric; and a bonding member having a first surface and a second surface at the other side of a side of the first surface, and being folded so that two points of the first surface meet, and the second surface being bonded to each of the first fabric and the second fabric.

The bonding member may be bonded to the first fabric and the second fabric by using an adhesive.

An internal space between the first fabric and the second fabric may be divided into a first region at the first surface side and a second region at an opposite side of the first region based on a folding line of the bonding member.

The bonding member may be formed in a strap form.

The folding line may be formed in a longitudinal direction of the bonding member.

A pair of bonding members, which is symmetric based on the second region, may be provided.

At least a part of the first fabric may be bonded to at least a part of the second fabric in the second region positioned between the pair of bonding members.

The second region positioned between the pair of bonding members may be minimized so that folding lines of the pair of bonding members are adjacent to each other.

One or more ventilation holes penetrating the first fabric and the second fabric may be formed in the second region.

A sealing line for bonding the first fabric and the second fabric may be formed in the second region.

The first region may be filled with fillings.

The fillings may include at least one of hair of mammals, hair of birds, cotton, and synthetic cotton.

The bonding member may be formed of a material different from that of at least one of the first fabric and the second fabric.

A thickness of the bonding member may be formed be equal to or smaller than thicknesses of the first fabric and the second fabric.

The bonding member may have a larger tensile strength than that of at least one of the first fabric and the second fabric.

Another exemplary embodiment of the present invention provides processed fabric goods having the aforementioned fabric bonding structures.

Yet another exemplary embodiment of the present invention provides processed fabric goods formed by processing fabrics, including: a first fabric provided at least a part of the processed fabric goods; a second fabric provided so as to be in contact with the first fabric; and a bonding member having a first surface and a second surface at the other side of the first surface, and folded so that two points of the first surface meet, and the second surface being bonded to each of the first fabric and the second fabric, and configured to divide an internal space between the first fabric and the second fabric into a first region at the first surface side and a second region at an opposite side of the first region based on a folding line of the bonding member; and fillings filled in the first region.

The bonding member may be formed at an edge portion of the processed fabric goods.

The bonding member may be provided so that the second region faces the edge portion of the processed fabric goods.

A plurality of bonding members may be provided, and the adjacent bonding members may be formed so that the first regions face each other and the second regions face each other respectively.

According to the fabric bonding structure according to the present invention and the processed fabric goods having the same, it is possible to isolate fillings filled inside a fabric from the outside even without forming a sewing line, and bonding force at a bonding portion is excellent compared to a method of forming a sewing line or a bonding method using an adhesive in the related art.

Further, according to the present invention, a sealing line, through which fillings are exposed, is not formed, thereby preventing the fillings from being unwantedly discharged.

Further, according to the present invention, even when a sewing line or a ventilation hole is formed for finishing clothes, a design element, and a function of clothes, the sewing line or the ventilation hole is formed in a region spaced apart from fillings, thereby preventing the fillings from being discharged to the outside.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
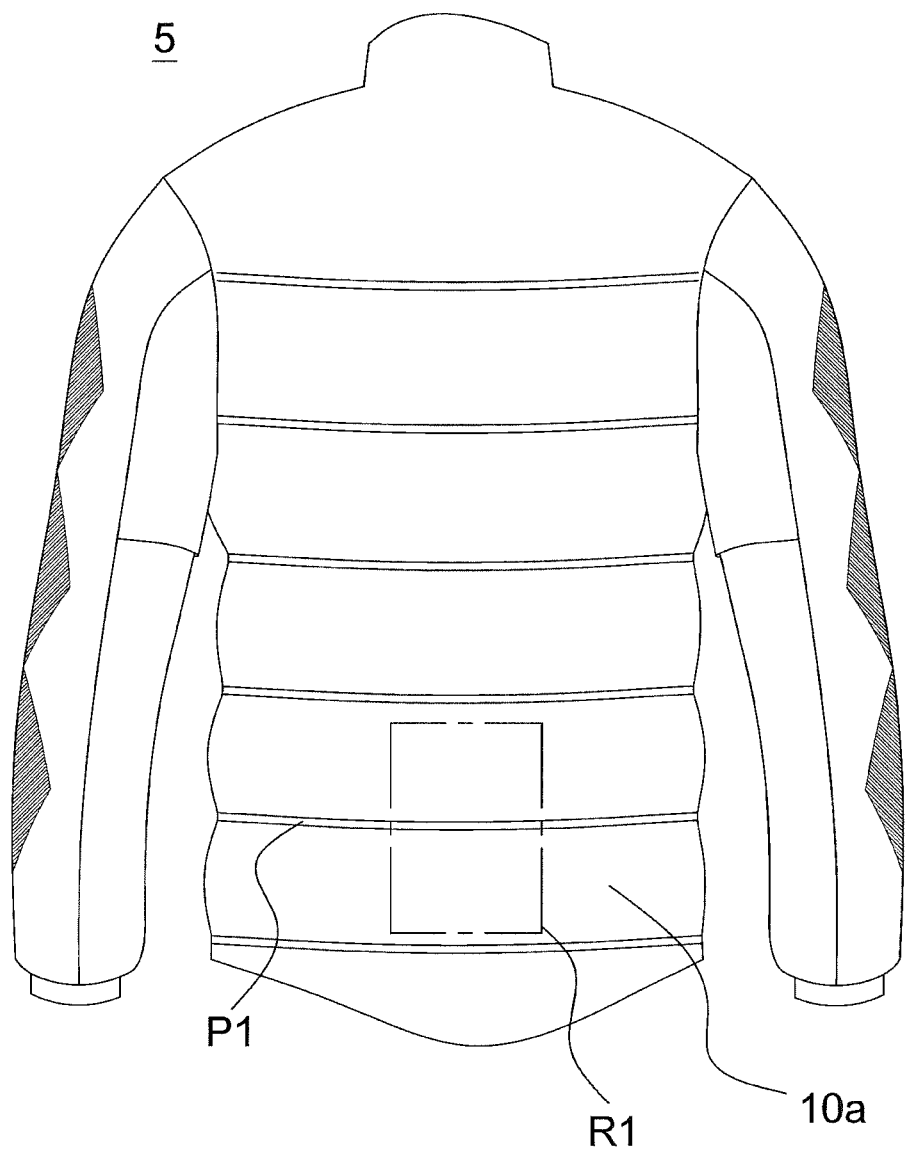
FIG. 1 is a rear view schematically illustrating clothes having a bonding structure.

Hereinafter, exemplary embodiments of the present invention will be described with reference to the accompanying drawings. Unless there is a special definition or mention, terms indicating directions used in the present description are based on a state illustrated in the drawing. Further, the same reference numeral designates the same member throughout each exemplary embodiment. In the meantime, for convenience of the description, a thickness or a size of each constituent element illustrated in the drawings may be exaggerated, and it does not mean that the constituent element needs to be actually configured with a corresponding size or a ratio between the elements.

A fabric bonding structure will be described with reference to FIGS. 1 to 3. FIG. 1 is a rear view schematically illustrating clothes having a bonding structure, FIG. 2 is a cut perspective view illustrating a region R1 of the clothes illustrated in FIG. 1, and FIG. 3 is a cross-sectional view illustrating the region R1 of the clothes illustrated in FIG. 1.

Clothes may adopt a bonding structure for bonding inner and outer fabrics by various manners as necessary. For example, as illustrated in FIG. 1, for a top filled with a lagging material inside thereof, an outer fabric 10a may be provided with a plurality of bonding parts P1, which is bonded to an inner fabric, according to an external appearance. Particularly, a jacket, such as a goose down jacket, filled with lagging fillings may be provided with the bonding parts P1 for preventing the fillings from being concentrated to a lower side due to gravity or from being agglomerated at one side during a washing process, and dividing a region filled with the fillings into a plurality of regions so as to implement an uniform thermal keeping property.

Figure 2:
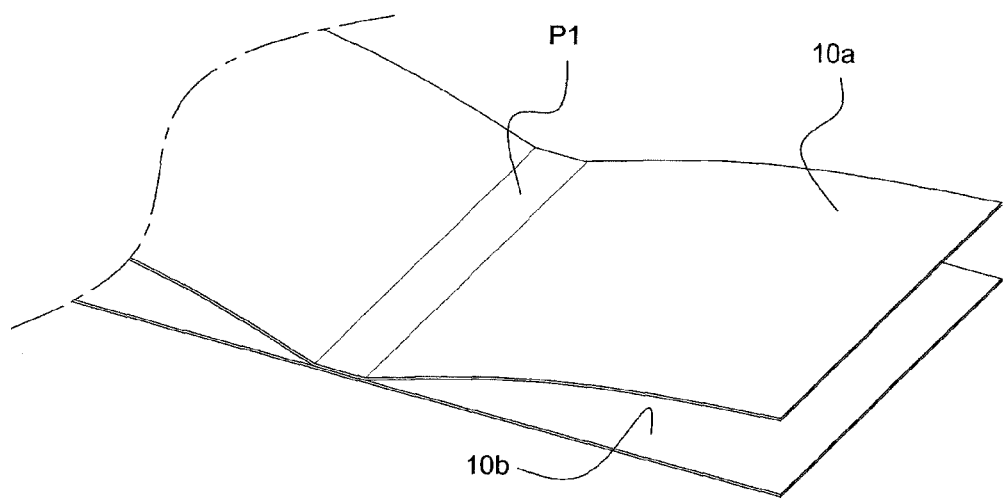
FIG. 2 is a cut perspective view illustrating a region R1 of the clothes illustrated in FIG. 1.
Figure 3:
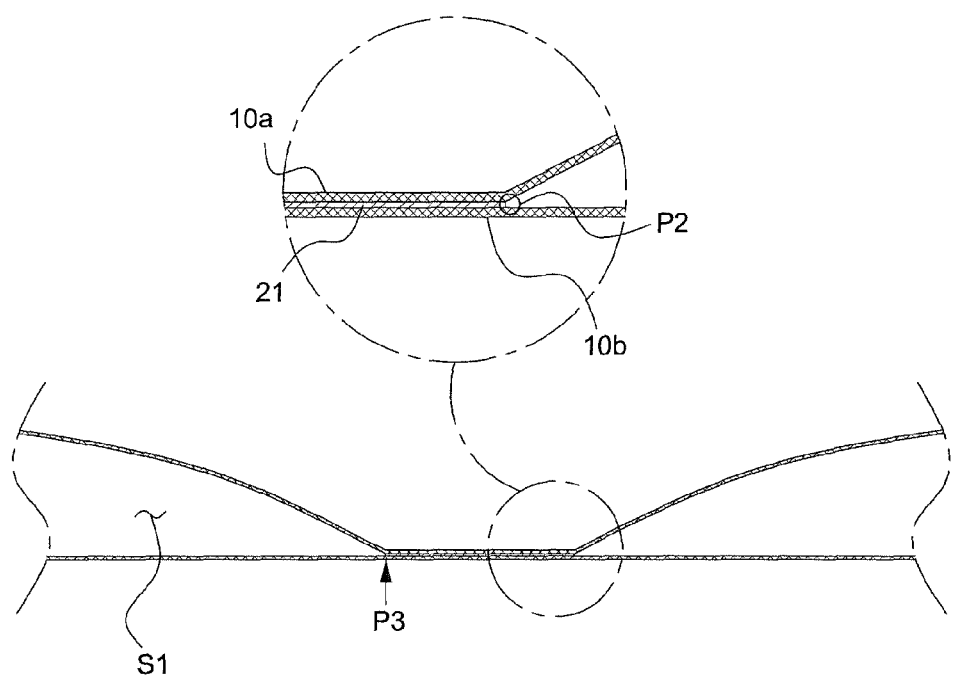
FIG. 3 is a cross-sectional view illustrating the region R1 of the clothes illustrated in FIG. 1.

Referring to FIGS. 2 and 3, a predetermined space is formed so as to be filled with the fillings between the outer fabric 10a and an inner fabric 10b, and the bonding parts P1 for dividing the spaces are formed. The bonding part P1 may be implemented by a manner of forming a sewing line in a predetermined region P3, or forming an adhesive layer 21 inside the bonding part P1. However, when the sewing line is formed, the fillings filled in a space S1 may be discharged to the outside through small holes of the sewing line. When a thick thread for bonding is used for sufficient bonding force, needle holes of the sewing line are increased, so that the discharge of the fillings to the outside may become more severe.

As a method of overcoming a disadvantage of the sewing line, an adhesive may be used. However, when the adhesive is used, separation force between the outer fabric 10a and the inner fabric 10b is concentrated to a region P2 in which a bonding part according to a cross-section view begins, so that the bonding part 21 may be easily damaged during a long-term degradation process of the adhesive or a separation process of the outer fabric 10a and the inner fabric 10b by a temporal impact.

The long-term or short-term degradation of the bonding force may be equally generated even when the sewing line is formed or the sewing line and the adhesive layer are simultaneously formed.

The present invention relates to a fabric bonding structure, which is capable of preventing bonding force from being degraded and preventing fillings from being discharged to the outside, and processed fabric goods, such as clothes and bedclothes, having the same. Hereinafter, the present invention will be described in detail.

Figure 4:
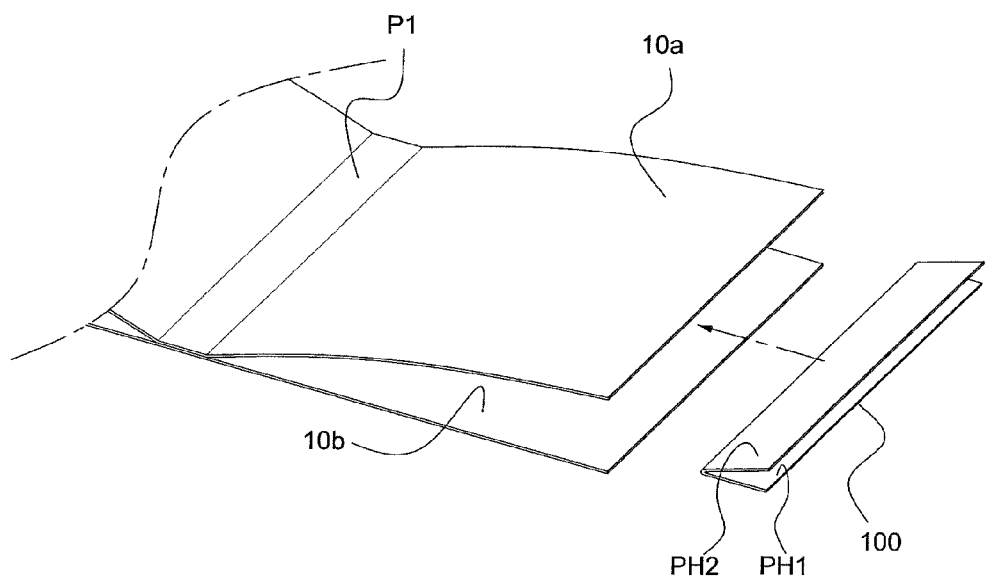
FIG. 4 is a cut perspective view illustrating a fabric bonding structure according to an exemplary embodiment of the present invention.

A fabric bonding structure according to an exemplary embodiment will be described with reference to FIGS. 4 to 6. FIG. 4 is a cut perspective view illustrating a fabric bonding structure according to an exemplary embodiment of the present invention, FIG. 5 is a cross-sectional view illustrating the fabric bonding structure of FIG. 4, and FIG. 6 is a schematic diagram for describing a function of the fabric bonding structure of FIG. 4.

Figure 5:
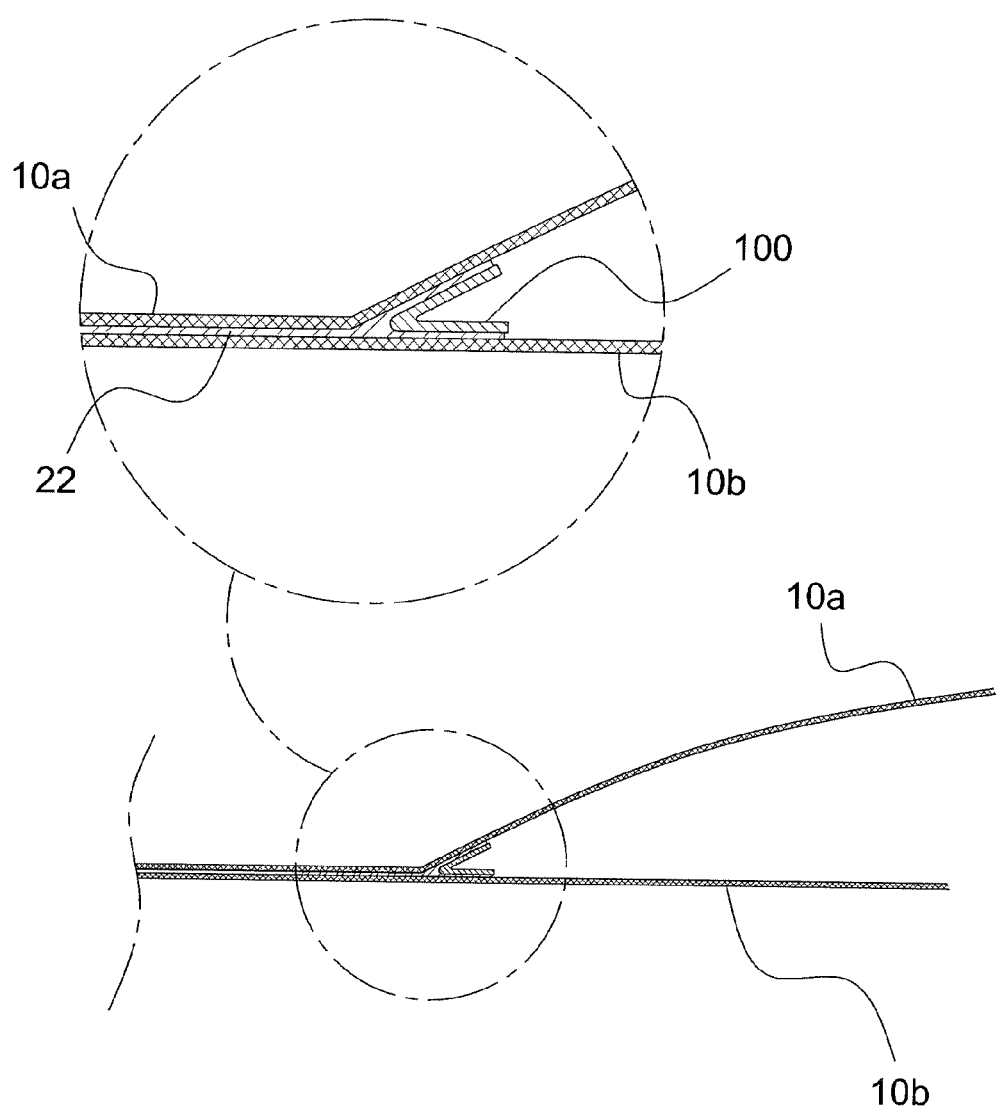
FIG. 5 is a cross-sectional view illustrating the fabric bonding structure of FIG. 4.
Figure 6:
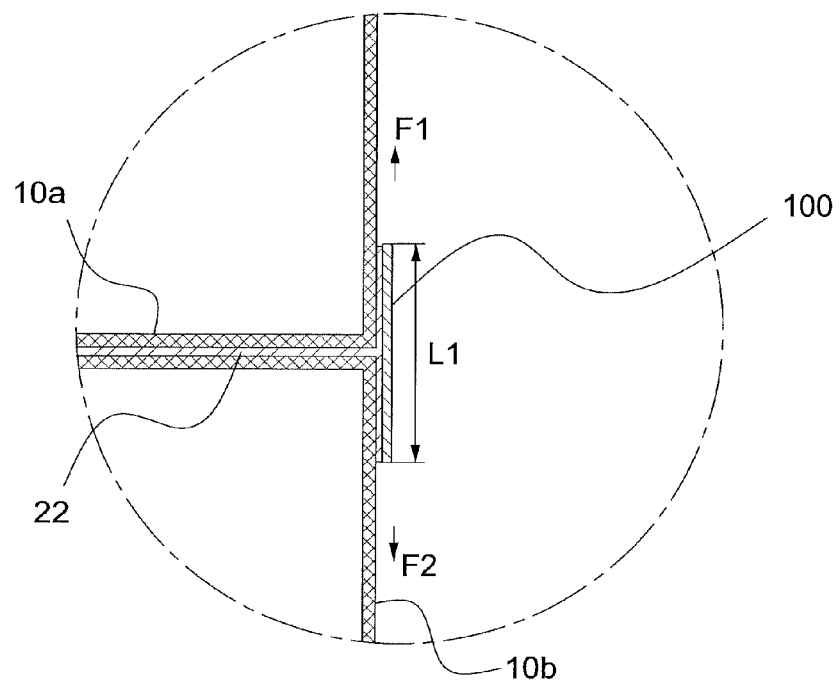
FIG. 6 is a schematic diagram for describing a function of the fabric bonding structure of FIG. 4.

Referring to FIGS. 4 and 5, the fabric bonding structure according to the present exemplary embodiment includes a bonding member 100.

The bonding member 100 is formed in a band-shaped fabric including first surfaces PH1 and second surfaces PH2 at the other sides of the first surfaces. The bonding member 100 is folded along a virtual folding line formed in a longitudinal direction thereof, so that the first surfaces PH1 may meet each other to form internal surfaces, and the second surfaces PH2 form external surfaces.

The bonding member 100 is inserted between the outer fabric 10a and the inner fabric 10b, and is provided to be adjacent to a bonding part P1 desired to be formed. In this case, the second surfaces PH2, that is, the external surfaces, of the bonding member, are bonded to an internal surface of the outer fabric 10a and an internal surface of the inner fabric 10b. In this case, the bonding member 100 may be bonded to the outer fabric 10a and the inner fabric 10b by using a widely used adhesive for fabric, such as textile or leather.

A space between the outer fabric 10a and the inner fabric 10b in a state where the bonding member 100 is provided is divided into two regions. A first region means a region in which a predetermined space is formed according to a folding state of the bonding member 100, and a second region means a region in which the outer fabric 10a and the inner fabric 10b meet each other at the other side of the predetermined space based on the bonding member 100.

In this case, the first region may be filled with fillings, such as hair of mammals, hair of birds, cotton, and synthetic resin cotton. By contrast, the second region is a region in which a ventilation hole or a sewing line may be formed. The upper fabric 10 and the inner fabric 10b in the second region may be bonded to each other by using an adhesive 22 in at least a partial region.

In the meantime, FIG. 6 is illustrated based on an assumption of directions of external force F1 and F2 in which maximum deformation is applicable according to separation of the outer fabric 10a and the inner fabric 10b. When the outer fabric 10a and the inner fabric 10b are intended to be separated from each other according to the application of external force, the bonding member 100 provided in the bonding region is separated together, to be aligned so as to correspond to the directions of the external force. In the simple bonding structure illustrated in FIG. 3, deformation force is concentrated to a predetermined point P2, so that a function of the adhesive may be easily lost. However, in the fabric bonding structure according to the present exemplary embodiment, deformation force according to external force F1 and F2 is evenly distributed in the entire bonding region L1. That is, in the fabric bonding structure according to the present exemplary embodiment, as long as the outer fabric 10a and the inner fabric 10b are not separated from the bonding member 100 at the same time in the entire bonding region L1 by external force, the outer fabric 10a and the inner fabric 10b may not be separated. It could be seen that when external force is increased, adhesive force is rather increased enough to first generate fracture in the outer fabric 10a or the inner fabric 10b.

A material of the bonding member 100 needs not to be essentially the same as that of the outer fabric 10a or the inner fabric 10b. Further, as described above, deformation force, by which the outer fabric 10a or the inner fabric 10b is separated, is distributed to the entire bonding region L1, so that the bonding member 100 may be formed to have a thickness equal to or smaller than a thickness of the outer fabric 10a or the inner fabric 10b. That is, when the bonding member 100 has a small thickness, but has sufficient durability and tensile strength, it is possible to rather increase bonding strength in the bonding portion.

Figure 7:
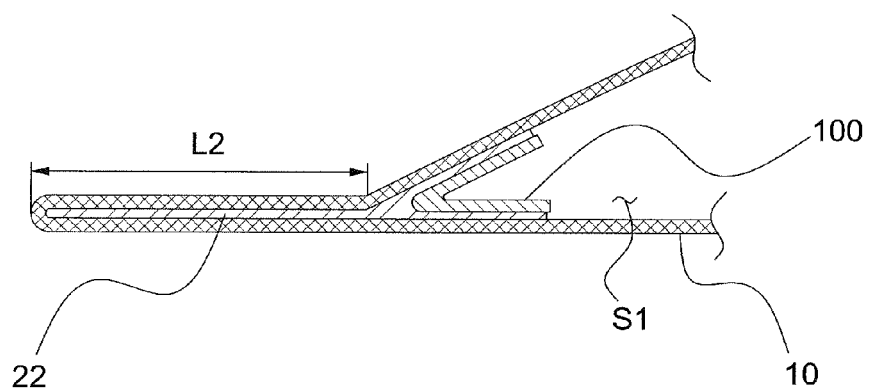
FIG. 7 is a cross-sectional view illustrating a fabric bonding structure according to another exemplary embodiment of the present invention.

A fabric bonding structure according to another exemplary embodiment will be described with reference to FIG. 7. FIG. 7 is a cross-sectional view illustrating a fabric bonding structure according to another exemplary embodiment of the present invention.

FIG. 7 illustrates a fabric bonding structure formed in an edge portion of clothes, bedclothes, and the like. In this case, a bonding member 100 is inserted into an internal side of a single fabric 10 in a state where the single fabric 10 is folded to bond the single fabric 10 without classifying upper and lower fabrics. In this case, the bonding structure and method are the same as those of the aforementioned exemplary embodiment.

As described above, a second region L2 formed at an external surface side of the bonding member 100 is spaced apart from fillings and the like, so that it is possible to freely form a sewing line, a ventilation hole, or the like, and it is possible to adjust a width of the second region L2 or remove the second region L2 as necessary.

When the bonding member 100 according to the exemplary embodiment of the present invention is provided, it is possible to variously form a sewing line, a ventilation hole, and the like without discharge of the fillings as described above, so that it is possible to further increase a degree of freedom in terms of a function and a design.

Figure 8:
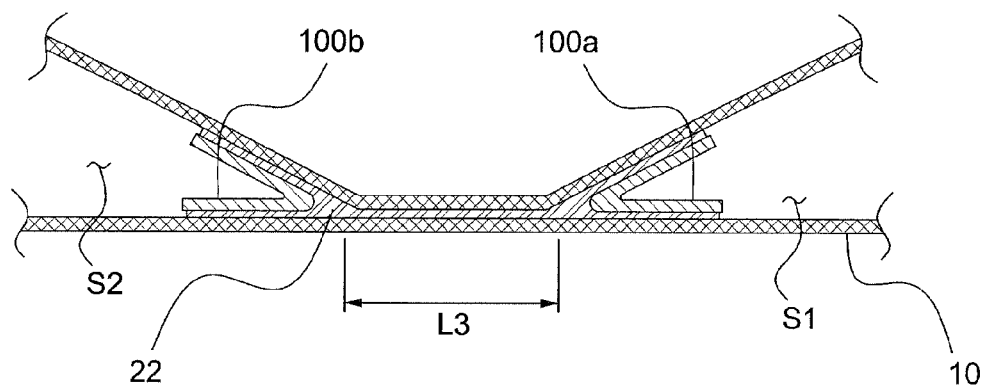
FIG. 8 is a cross-sectional view illustrating a fabric bonding structure according to yet another exemplary embodiment of the present invention.
Figure 9:
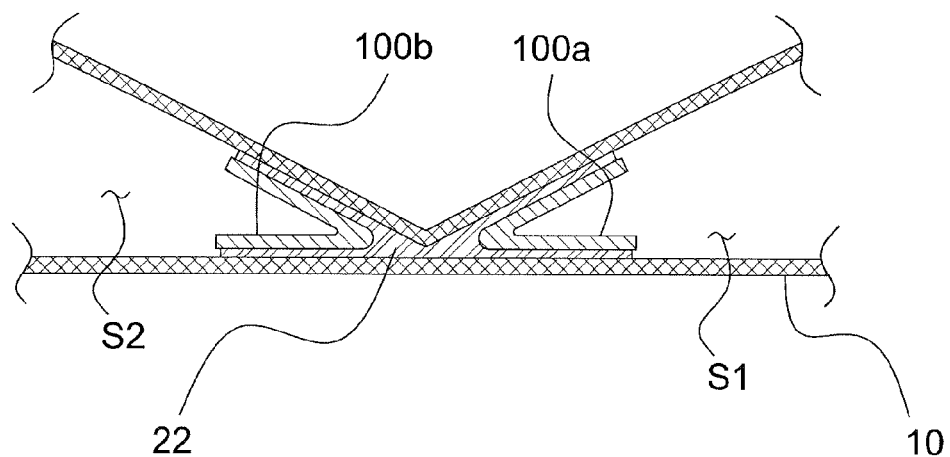
FIG. 9 is a cross-sectional view illustrating a modified example of the exemplary embodiment of FIG. 8.

A fabric bonding structure according to yet another exemplary embodiment will be described with reference to FIGS. 8 and 9. FIG. 8 is a cross-sectional view illustrating a fabric bonding structure according to yet another exemplary embodiment of the present invention, and FIG. 9 is a cross-sectional view illustrating a modified example of the exemplary embodiment of FIG. 8.

As illustrated in FIG. 8, a pair of bonding members 100a and 100b may be provided to one bonding portion.

Particularly, the pair of bonding members 100a and 100b is symmetrically provided so that external surfaces thereof face each other. In this case, a sewing line, a ventilation hole, or the like may be freely formed in a region L3 between the two bonding members 100a and 100b as described above, and spaces S1 and S2 formed internal sides of the two bonding members 100a and 100b may be filled with fillings.

The fabric bonding structure according to the present exemplary embodiment may be used for dividing a charging region at a center portion of clothes, bedclothes, and the like, and firmly maintain the bonding structure of the bonding region L3 against separation in a first charging region S1 or a second charging region S2, distortion between fabrics 10 according to external force or the like.

Further, a width of the bonding region L3 may be adjusted as necessary, and the bonding region L3 may be minimized as illustrated in FIG. 9. The structure may be used as a fabric bonding structure for maximally increasing thermal resistance.

Figure 10:
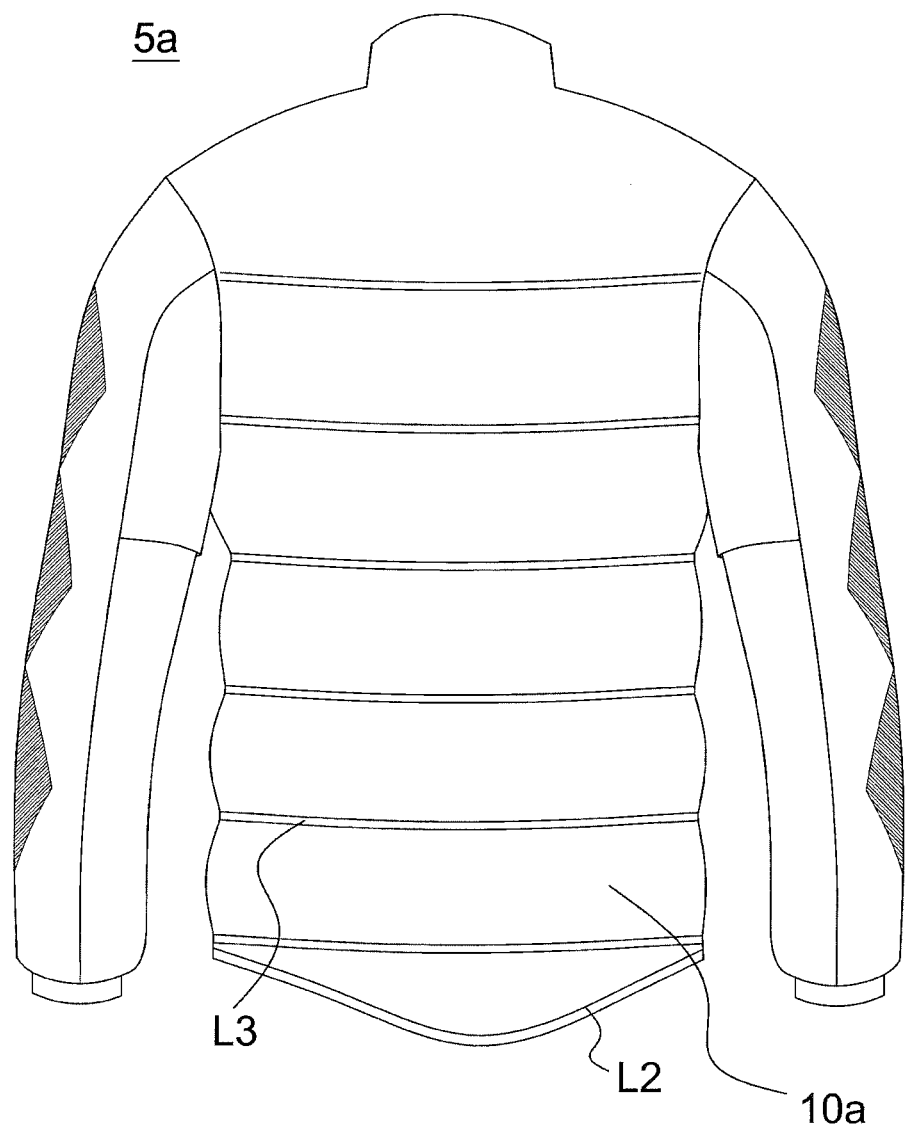
FIG. 10 is a rear view illustrating clothes including the fabric bonding structures according to the exemplary embodiments of the present invention.

Processed fabric goods including the fabric bonding structures, to which the present exemplary embodiments are applied, will be described with reference to FIG. 10. FIG. 10 is a rear view illustrating clothes including the fabric bonding structures according to the exemplary embodiments of the present invention.

In the meantime, the fabric bonding structures according to the exemplary embodiments are variously applicable to the processed fabric goods according to the present invention. The processed fabric goods may correspond to various product groups, such as clothes and bedclothes, and be applied to various kinds of fabric, such as textile and leather.

As illustrated in FIG. 10, the fabric bonding structure according to the present invention may be introduced to a jacket 5a.

For example, the boding region L3 according to the exemplary embodiment illustrated in FIGS. 5, 8, and 9 is applied to a center portion of a rear surface of the jacket 5a, so that it is possible to minimize concentration or agglomeration of internally filled fillings and prevent the fillings from being discharged to the outside. In this case, the bonding region L3 may be formed by symmetrically forming the pair of bonding members so that folding lines of the bonding members are adjacent to each other. That is, the single pair of bonding members may be provided inside the outer fabric 10a of the jacket 5a, and the bonding members are formed so that the first region and the second region face each other to form the closed first and second regions. As described above, the first region may be filled with the fillings, and the bonding region L3 or a sealing line and/or a ventilation hole may be formed in the second region.

Further, for example, the bonding region L2 according to the exemplary embodiment illustrated in FIG. 5 or 7 is applied to a lower end of the rear surface of the jacket 5a, thereby improving durability of an edge of clothes and increasing a degree of freedom in terms of a design. The bonding structures may be implemented at various portions, such as an arm portion, as well as a rear surface and a front surface of clothes.

Further, the bonding structures may be applied to blanket filled with goose down and the like, thereby improving durability and sanitarily managing the blanket and the like.

It will be appreciated by those skilled in the art that the present invention described above may be implemented into other specific forms without departing from the technical spirit thereof or essential characteristics. Thus, it is to be appreciated that embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. A fabric bonding structure, comprising:
   a first fabric;
   a second fabric provided so as to be in contact with the first fabric; and
   a bonding member having a first surface and a second surface at the other side of a side of the first surface, and being folded so that two points of the first surface meet, and the second surface being bonded to each of the first fabric and the second fabric.

2. The fabric bonding structure of claim 1, wherein the bonding member is bonded to the first fabric and the second fabric by using an adhesive.

3. The fabric bonding structure of claim 1, wherein an internal space between the first fabric and the second fabric is divided into a first region at the first surface side and a second region at an opposite side of the first region based on a folding line of the bonding member.

4. The fabric bonding structure of claim 3, wherein the bonding member is formed in a strap form.

5. The fabric bonding structure of claim 4, wherein the folding line is formed in a longitudinal direction of the bonding member.

6. The fabric bonding structure 3, wherein a pair of bonding members, which is symmetric based on the second region, is provided.

7. The fabric bonding structure of claim 6, wherein at least a part of the first fabric is bonded to at least a part of the second fabric in the second region positioned between the pair of bonding members.

8. The fabric bonding structure of claim 6, wherein the second region positioned between the pair of bonding members is minimized so that folding lines of the pair of bonding members are adjacent to each other.

9. The fabric bonding structure of claim 3, wherein one or more ventilation holes penetrating the first fabric and the second fabric are formed in the second region.

10. The fabric bonding structure of claim 3, wherein a sealing line for bonding the first fabric and the second fabric is formed in the second region.

11. The fabric bonding structure of claim 3, wherein the first region is filled with fillings.

12. The fabric bonding structure of claim 11, wherein the fillings include at least one of hair of mammals, hair of birds, cotton, and synthetic cotton.

13. The fabric bonding structure of claim 1, wherein the bonding member is formed of a material different from that of at least one of the first fabric and the second fabric.

14. The fabric bonding structure of claim 1, wherein a thickness of the bonding member is formed be equal to or smaller than thicknesses of the first fabric and the second fabric.

15. The fabric bonding structure of claim 1, wherein the bonding member has a larger tensile strength than that of at least one of the first fabric and the second fabric.

16. Processed fabric goods having the fabric bonding structure of claim 1.

17. Processed fabric goods formed by processing fabrics, comprising:
    a first fabric provided at least a part of the processed fabric goods;
    a second fabric provided so as to be in contact with the first fabric; and
    a bonding member having a first surface and a second surface at the other side of the first surface, and folded so that two points of the first surface meet, and the second surface being bonded to each of the first fabric and the second fabric, and configured to divide an internal space between the first fabric and the second fabric into a first region at the first surface side and a second region at an opposite side of the first region based on a folding line of the side and a second region at an opposite side of the first region based on a folding line of the bonding member; and
    fillings filled in the first region.

18. The processed fabric goods of claim 17, wherein the bonding member is formed at an edge portion of the processed fabric goods.

19. The processed fabric goods of claim 18, wherein the bonding member is provided so that the second region faces the edge portion of the processed fabric goods.

20. The processed fabric goods of claim 17, wherein a plurality of bonding members is provided, and the adjacent bonding members are formed so that the first regions face each other and the second regions face each other respectively.

* * * * *